Dec. 25, 1945.  W. SEYMOUR  2,391,484
APPARATUS FOR TREATING AMMONIUM SULPHATE CRYSTALS
Filed Aug. 3, 1940
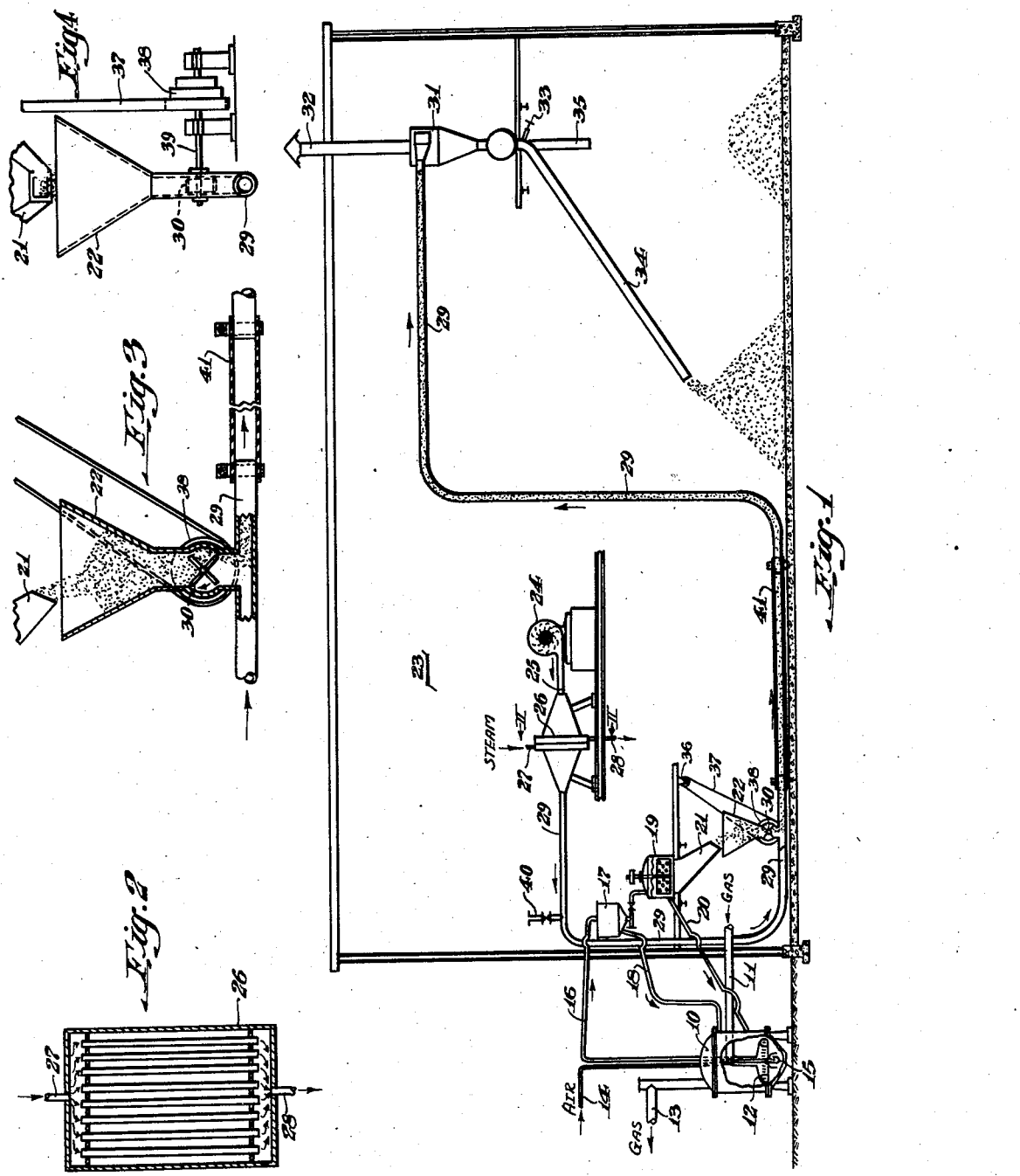
INVENTOR.
WILLIAM SEYMOUR.
BY Henry Love Clarke
ATTORNEY.

Patented Dec. 25, 1945

2,391,484

UNITED STATES PATENT OFFICE 2,391,484

APPARATUS FOR TREATING AMMONIUM SULPHATE CRYSTALS

William Seymour, Sault Ste. Marie, Ontario, Canada, assignor, by mesne assignments, to Koppers Company, Inc., a corporation of Delaware Application August 3, 1940, Serial No. 350,873

1 Claim. (Cl. 34—57)

The present invention relates to an improved system for simultaneously drying and conveying wet, clingy masses of materials and more especially such substances as the moist ammonium-sulphate crystals discharged from those centrifuges or other apparatus that are commonly employed in coke-oven by-product plants for separating crystalline ammonium sulphate from its mother liquor but which are not adapted thoroughly to dry the so-separated crystalline substance.

In its recovery from coke-oven gas, ammonia is commonly converted into ammonium sulphate by flowing it in gaseous form and in admixture with other gases or vapors through an aqueous bath of dilute sulphuric acid. After the bath-liquor becomes saturated with the formed ammonium sulphate, crystals thereof appear throughout the bath wherein they may be in suspension due to the agitation of the inflowing gases. Continuously or intermittently withdrawing from the reaction vessel a mixture of said crystals and the bath-liquor and centrifugalizing the same, separates a crystalline mass of the salt, which after it is washed with water, dilute ammonia liquor, or the like, to reduce its residual acidity, normally contains about 2 to 3 per cent of moisture that is in the form of a substantially concentrated solution of the salt distributed over the crystal-surfaces causing them to adhere to each other. Upon subsequent evaporation of this moisture, its content of ammonium sulphate is deposited on the crystal-surfaces and if the moist material is stored in heaps during the drying process, the deposited salt can act as a sort of cementing agent to agglomerate the whole into a cake that is difficultly disintegrated, especially if the drying takes place under pressure, for example, of the salt's own weight. In consequence, it is therefore highly desirable, before delivering the recovered ammonium-sulphate crystals to a place of storage, that most of the moisture residual to their centrifugalization be removed by means adapted thoroughly to dry them and to produce the non-caking variety of that material known in the trade as Arcadian sulphate which shall contain less than 0.25 per cent moisture. Such drying is especially desirable if the sulphate is to be bagged immediately.

An object of the present invention is therefore to provide for coke-oven by-product plants a practical system whereby such crystalline ammonium sulphate as that discharged from centrifuges, or other drying means, with a content of about 2 to 3 per cent of moisture can be thoroughly dried to a non-caking form at the same time it is being conveyed to a preferred place for its storage or for bagging.

A further object of invention is the provision for the stated purpose of a practical system whereby moist ammonium sulphate can be introduced into a conveying current of hot relatively drier air and can be thereby simultaneously exsiccated and transported to a place of delivery and can be also automatically discharged from such system without substantial degradation of the salt's crystal-size or sizes.

A further object of improvement is to provide in a system for the stated purpose, apparatus whereby moist ammonium sulphate can be continuously delivered into a conveying stream of heated air, without important loss of that medium from its conveying stream, and at a regulable rate consistent with the conveying ability thereof, thereby to obviate deposition of the clingy, moist salt on the conveyor walls where, upon drying, they would tend to form adherent crust-like stoppages in the system.

A further object of improvement is to provide for the stated purpose a system that is susceptible of simple regulation to levitate and transport salt crystals of variable sizes and to deliver them, without important breakage, in substantially the same particle size.

The invention has for further objects such other improvements and such other operative advantages or results as may be found to obtain in the processes or apparatus hereinafter described or claimed.

According to the present invention, crystalline ammonium sulphate having such small percentages of moisture therein as obtain, for example, after this salt is discharged from the centrifuges commonly employed in coke-oven by-product plants for recovering it from the saturator liquor, is introduced into a stream of air that is flowing at a velocity adequate to levitate said salt and to carry it along therewith, the relative humidity of the air of such stream having been previously brought by any preferred means, such for example as heat, to a point where its capacity for evaporating water is adequate to dry the moist salt to a preferred extent before it is deposited from the gaseous stream at a point of delivery. The improvement provides also a simple device whereby the moist salt can be regulably introduced into the conveying air stream in accordance with the conveying and the water-evaporating capacities of the latter. The various essential features of apparatus of the system are so disposed that the ammonium sulphate is brought into contact, during its conveyance, with no moving parts that would tend to degradate its crystal-size; in addition, the instant system also provides simple means whereby the wet salt is introducible into the stream of drying air without important wastage of air therefrom.

In the accompanying single sheet of drawings forming a part of this specification and showing for purposes of exemplification a preferred apparatus and method in which the invention may be embodied and practiced but without limiting the claimed invention specifically to such illustrative instance or instances;

Fig. 1 shows an elevational view, parts in section, of apparatus adapted to practice the present improvements for drying the wet, crystalline ammonium sulphate recovered from the saturators of coke-oven by-product plants;

Fig. 2 is an enlarged view of a section taken along the line II—II of Fig. 1 and showing the means for heating the current of air, or similar fluid, employed for conveying and drying the said ammonium sulphate;

Fig. 3 is an enlarged fragment of Fig. 1 and showing in greater detail the device for introducing the wet ammonium sulphate into the conveying and drying air current employed according to the present improvement; and Fig. 4 is an enlarged side view of a portion of Fig. 1 showing the driving arrangement of the star-wheel whereby the moist salt is introduced into the conveyor-conduit of the apparatus.

The same characters of reference designate the same parts in each of the views of the drawing.

Referring now to the drawing: there is shown saturator 10 of a coke-oven by-product plant that is adapted to contain a dilute aqueous solution of sulphuric acid. Ammonia-containing gas that issues from the coking ovens is flowed under the influence of the usual exhauster apparatus (not shown) through pipe 11 into said saturator wherein it is evenly distributed through the acid bath by means of cracker-pipe 12 that breaks the stream of said gas into relatively fine bubbles which, as they flow upwardly through the bath-liquor, are relieved of their content of ammonia by combination with the acid to form ammonium sulphate, the substantially ammonia-free gas issuing from the saturator by way of outlet-pipe 13 whence it passes to further treatment.

Eventually the saturator-bath becomes saturated with ammonium sulphate whereupon there appears distributed therethrough crystals of said salt. A stream of air, either continuously or intermittently flowed through pipe 14 and, into ejector means 15, elevates a small fraction of the bath-liquor along with said salt crystals suspended therein through pipe 16 and onto draintable 17 which is arranged to effect a preliminary separation of said salt and bath-liquor, the latter being returned to the saturator through pipe 18. From said drain-table, the recovered salt is passed to the basket of centrifuge 19 and centrifugalized to bring about a more effective separation of the two constituents, the so-separated liquor being returned to the saturator through pipe 20. The centrifuge may be continuously or intermittently operated. The ammonium sulphate segregated in the basket of the centrifuge can be optionally washed with water, dilute ammoniacal solution, or the like, to remove or neutralize its residual acid, whereupon the moist salt is removed from the centrifuge and passed through the delivery-chute 21 into hopper-bottomed receiver 22 with a moisture content of about 2 to 3 per cent.

The by-product house 23, which contains the apparatus of the instant improved system, also houses the storage space for stocking the dried ammonium sulphate.

Blower 24 of the instant system, which can be driven by any preferred means, is disposed to flow a conveying stream of air through pipe 25 around the heating pipes of space-heater 26 comprising a tube-bank arranged to receive and to exhaust steam from header pipes respectively 27, 28. Heater 26 should be of adequate size to increase the temperature of the air flowed over its coils until its water-evaporating capacity, i. e. the relative humidity thereof is sufficiently reduced that, at its preferred velocity of flow through pipe 29, the so-heated air can evaporate the required amount of moisture from the wet ammonium sulphate introduced into said hot-air stream from receiver 22.

From space-heater 26, the hot stream of air is flowed through pipe 29 downwardly and then horizontally past the outlet of receiver 22 where it comes into contact with wet ammonium sulphate regulably withdrawn from said receiver by means of star-wheel 30 that is adapted, through any preferred actuating device, for rotation at divers rates on its supporting shaft to deliver wet salt into the current of heated air. In the instant apparatus, the said starwheel 30 is rotated by a pulley that is attached to the line-shaft 36 and operates through belt 37 and cone pulley 38, as shown in Fig. 4, to turn drive-shaft 39 at the one end of which is rotatably mounted the star-wheel, said cone pulley making it possible to rotate said member 30 at a plurality of speeds.

The wet ammonium sulphate discharged from said receiver, as it descends into contact with the stream of hot-air flowing through pipe 29, is levitated thereby and carried along through the remaining horizontally-extending section of said pipe and into the vertical section thereof eventually entering the cyclone-type extractor 31 wherein the now dried salt is baffled from the conveying air which is reduced in temperature and is discharged from the system through the extractor's hooded outlet 32 on the roof of the by-product building, the dried and now easily flowable mass of ammonium sulphate collecting in the bottom of the cyclonic separator whence, by valve means 33, it can be discharged through pivotally-mounted delivery-pipe 34 over a large area of the illustrated storage space or be dropped directly beneath said extractor by valve-controlled pipe 35.

In the present system, the ammonium-sulphate crystals at no time come into contact with moving parts of the blower apparatus, but are rather indirectly conveyed thereby which advantageously tends to preserve them in the original form they had upon their removal from the saturator.

Efficient operation of a system of the present type for simultaneously conveying and drying moist ammonium sulphate depends to considerable extent on the suitability for the purpose of that feature of apparatus whereby the moist salt is introduced into the heated air stream; such device must be adapted to admit the moist salt into the said air blast without substantial loss of air from the system and also in such manner and at such rate as do not exceed the existing conveying-capacity of said air-stream, so that all of the wet salt is immediately picked up and carried along thereby with a minimum of contact with the conduit walls, more especially when said salt is still in a clingy condition. Both these requirements are practically met by means of the combination comprising the simple hopper-shaped receptacle and the star-wheel, respectively 22 and 30, of the illustrated apparatus. By maintaining an adequate depth of wet salt in the former, the same is simply made self-sealing and in consequence of the contemplated variable rotation of the latter, it is possible positively to deliver wet salt into the blast of hot air at a rate which is consistent with its conveying and drying capacity to produce the desired exsiccation of the salt before it is discharged from the system at the separator 31.

It has been found advantageous, for obviating the accumulation of incrustations of ammonium sulphate on the walls of the conveyor-pipe 29, not significantly to alter its direction before the salt conveyed therethrough has been dried sufficiently to have lost at its velocity most of its tendency or ability to cling to the walls of the conduit when coming in contact with its surface. As will be noted in Fig. 1, the conduit-pipe 29 extends in a straightline for a considerable distance beyond the point where the wet salt has been introduced thereinto before there is any change in its direction. Such incrustations as do occur normally appear a short distance down-stream of the salt inlet adjacent to star-wheel 30. A convenient solution of this disadvantage has been found in the forming of a short length, 41, of said conduit-walls from flexible rubber pipe, as indicated particularly in heavy diagonal lines in Fig. 3. Periodic flexing of this rubber pipe breaks the incrustations and loosens them from the conduit-walls without interrupting operations or the necessity of breaking the conduit-connections.

For those instances where the crystalline ammonium sulphate discharged from centrifuge 19 contains so much moisture that the mass tends to hang-up or bridge over the star-wheel located at the bottom of hopper 22, a high-frequency electric vibrator, or the like, is of advantage in providing a continuous delivery of such salt to the star-wheel.

The acidity residual to the crystalline ammonium sulphate separated in centrifuge 19 from the saturator bath can be conveniently neutralized in the drying-and-conveying conduit by ammonia introduced into the hot levitating gas instead of treating them with an ammoniacal solution while they are in the centrifuge as hereinbefore mentioned. For this purpose either gaseous ammonia or a strong solution thereof can be introduced in appropriate quantities and rates into the heated air flowed through conduit 29 at its valved branch connections 40.

The illustrated system is also especially suitable for uniformly mixing with the ammonium sulphate small quantities of such substances as magnesium carbonate that have the property of resisting any tendency toward caking that the treated sulphate may exhibit. Such materials can be introduced in finely comminuted form into the conduit from a branch line and, as they are borne along by the flowing air, become thoroughly admixed with the sulphate before it is deposited in the cyclone-extractor 31.

By means of the present improvement it is now possible continuously to recover crystalline ammonium sulphate from the saturators of coke-oven by-product plants and to dry the same and to convey and to deliver it in a non-caking form to a preferred place of storage without the inconvenience of any manual handling.

The following example is illustrative of results obtainable by employment of the principles of the present invention. In a coke-oven by-product plant, a drying-and-conveying apparatus for the wet crystalline ammonium sulphate discharged from the centrifuges was formed of standard 8-inch steel pipe joined together to form a conduit having an over-all length of 125 feet and containing a total of 15 feet of bends having a 4-foot radius. The walls of said conduit were covered throughout with a 1-inch insulation of hair felt itself covered with corrugated asbestos paper.

Into this conduit, air at 68° F. and having a relative humidity of 24 per cent was blown at the rate of about 1160 cubic feet per minute by means of a fan-type blower. This air was then heated to 250° F. by passage over three rows of blast-heaters of the Trane type. After the heating step, the pressure of the heated air in the conduit was 9¾ inches of water. At the point of introduction of the wet salt, the pressure of the heated air was 6¾ inches of water.

Wet ammonium sulphate introduced into the drying-and-conveying conduit at the rate of 30 pounds per minute and with a moisture content of 2.50 per cent was discharged from the cyclonic separator containing 0.12 per cent moisture.

The invention as hereinabove set forth is embodied in particular form and manner but may be variously embodied within the scope of the claim hereinafter made.

I claim:

In a system for drying moist crystalline masses of salt into a substantially dried and non-caking form while simultaneously pneumatically conveying them to storage means therefor, a pneumatic-conveyor drier-conduit extending to the storage means, means for introducing hot drying gas into the conduit to simultaneously dry moist crystals by contact with hot gas while pneumatically conveying them through the conduit to storage means therefor at one end of the conduit; a device arranged to introduce moist crystals of said salt into said conduit beyond the point of introduction of hot gas but well in advance of the delivery end of the conduit for discharge to the storage means, said conduit having, at a location downstream of said salt introducing device, where the drying salt exhibits a tendency to cling thereto, a conduit section of flexible side-walls that are capable of being flexed from the exterior of the conduit, so that incrustations of said salt can be dislodged by merely flexing said conduit-section from its exterior.

WILLIAM SEYMOUR.